Jan. 11, 1938.  W. S. SAUNDERS  2,104,767
STORAGE BATTERY INSTALLATION
Filed Aug. 21, 1936   3 Sheets-Sheet 1
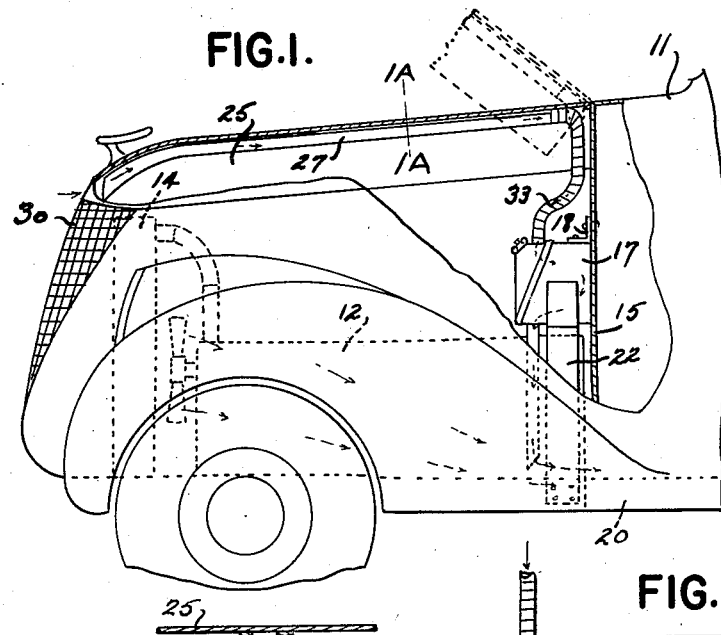
FIG.1.
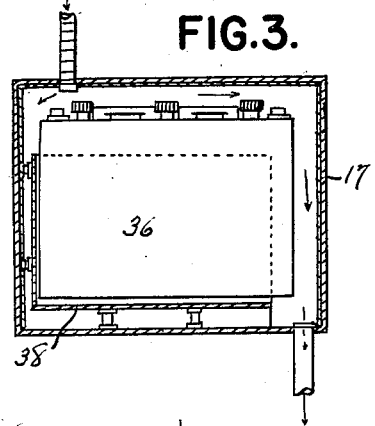
FIG.1A.
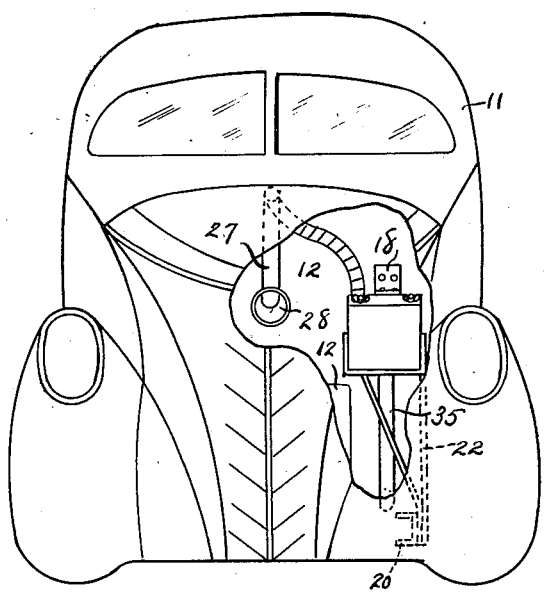
FIG.2.
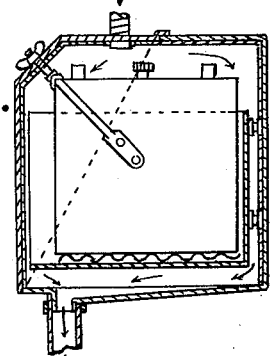
FIG.3.
FIG.4.
INVENTOR
Walter S. Saunders
BY
ATTORNEYS Jan. 11, 1938.   W. S. SAUNDERS   2,104,767
STORAGE BATTERY INSTALLATION
Filed Aug. 21, 1936   3 Sheets-Sheet 2
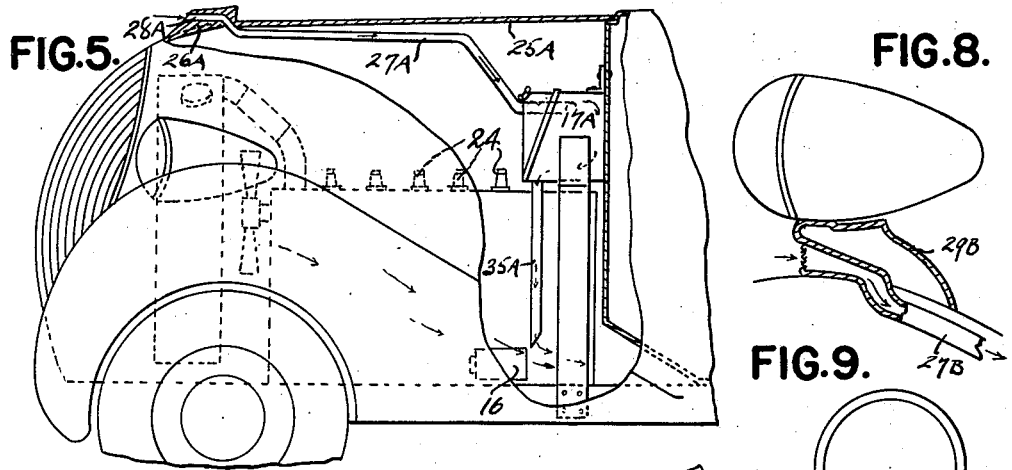
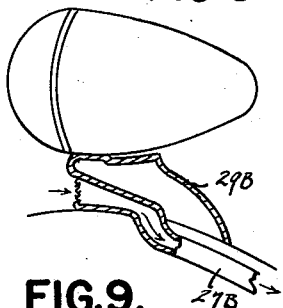
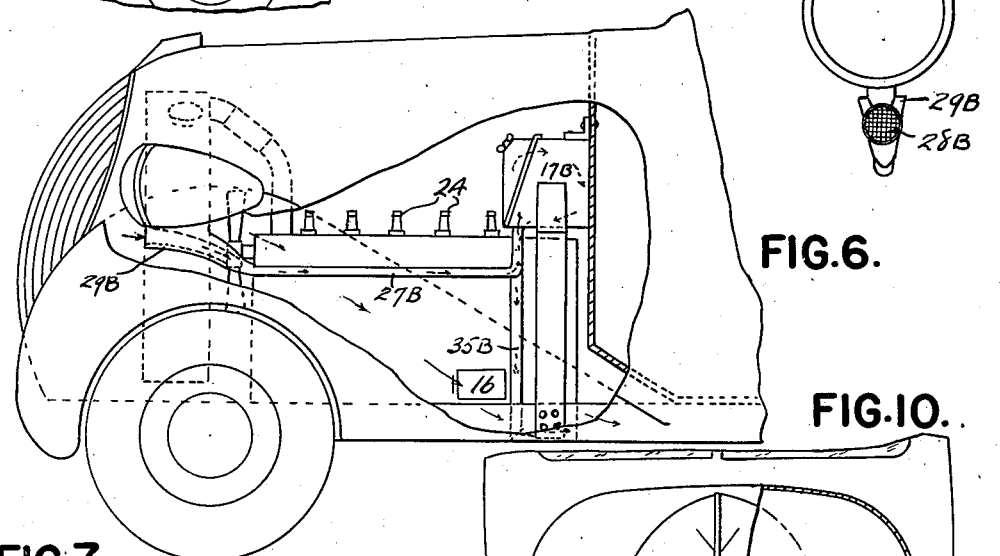
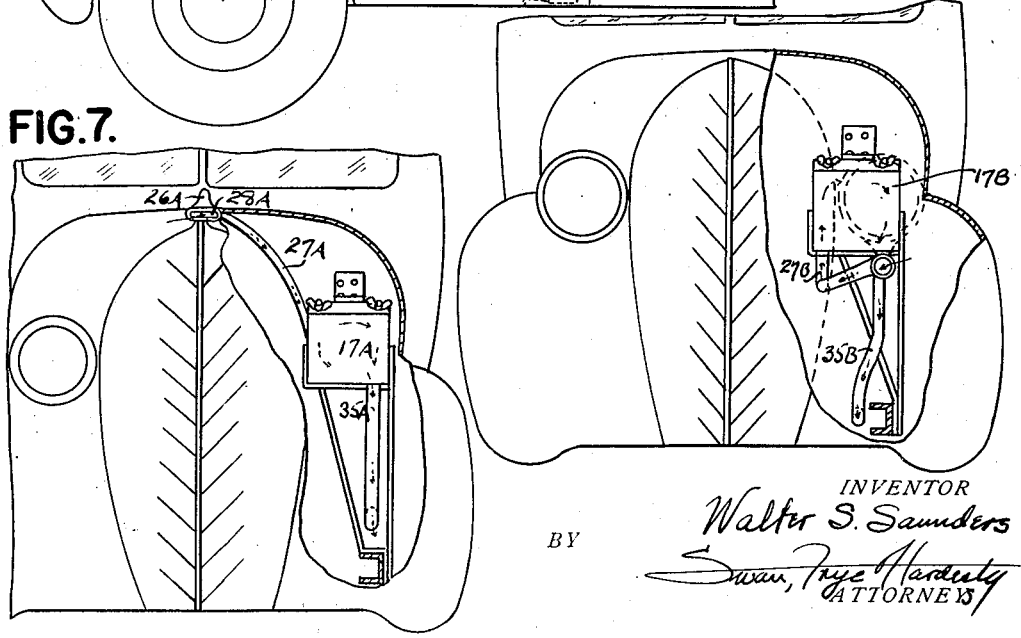

Jan. 11, 1938.    W. S. SAUNDERS    2,104,767
STORAGE BATTERY INSTALLATION
Filed Aug. 21, 1936    3 Sheets-Sheet 3
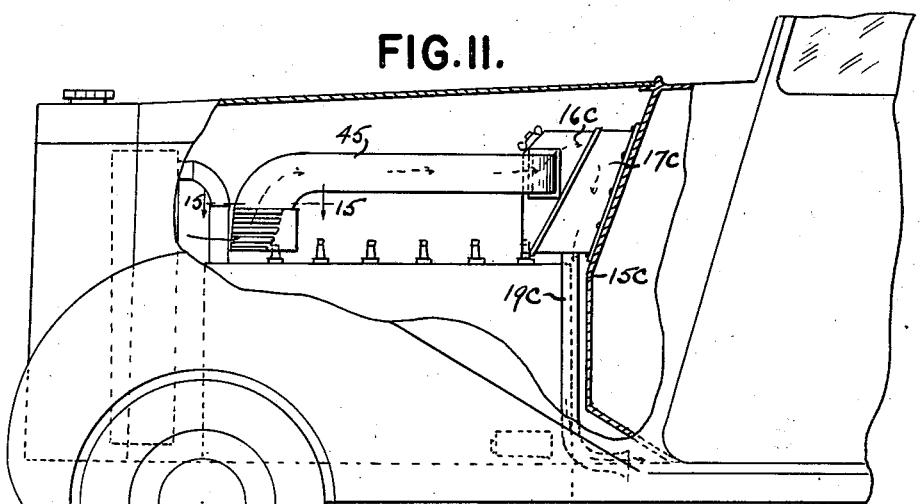
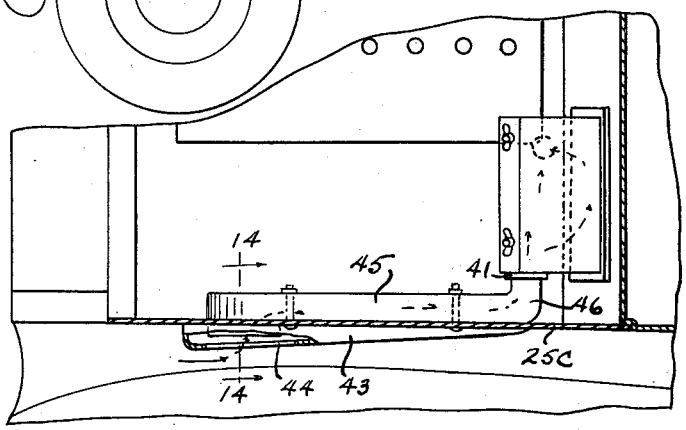
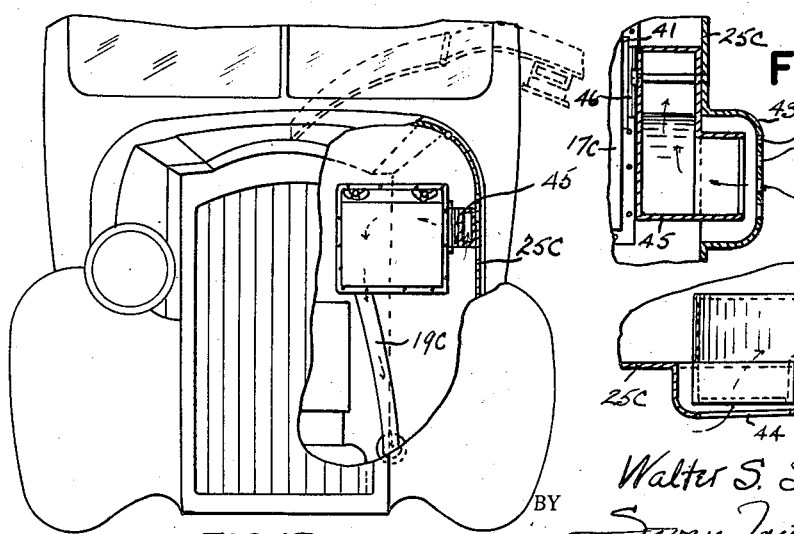
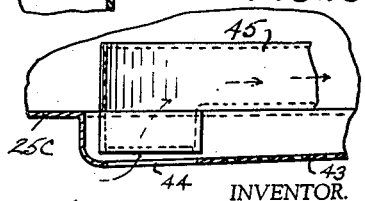
INVENTOR.
Walter S. Saunders
BY
Swan, Frye Hardesty
ATTORNEYS Patented Jan. 11, 1938

2,104,767

UNITED STATES PATENT OFFICE 2,104,767

STORAGE BATTERY INSTALLATION

Walter S. Saunders, Pontiac, Mich., assignor to The American Forging and Socket Company, Pontiac, Mich., a corporation of Michigan Application August 21, 1936, Serial No. 97,210

4 Claims. (Cl. 180—68.5)

This invention relates to the installations of storage batteries, particularly in automobiles, constituting a further development of the subject matter disclosed in my copending application Serial Number 64,909 filed February 20, 1936.

An object of the invention is the provision of improved means for supporting and ventilating the storage battery, which means incorporates in simple and inexpensive form a ventilating inlet arranged to intercept unheated air at a point in advance of or entirely removed from the heated parts of the vehicle, and to conduct such air to the battery case to cool the battery and carry away the fumes emanating therefrom.

Another important object is the provision of such battery supporting means located partly or entirely within the engine compartment and close to the engine, but so arranged that the battery is protected against the heat of the engine, and the ventilating means and battery holding elements offer no interference with accessibility of the engine.

Other important objects include the provision of means for protecting the battery against being struck by objects in the road, and against the weather and foreign matter, which nevertheless affords most accessible housing means for the battery, allowing convenient inspection, filling and removal thereof, as well as servicing and inspection of the connecting wiring.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a somewhat diagrammatic fragmentary side elevational view of the front of an automobile provided with ventilating means incorporating the principles of this invention.

Figure 1A is a detailed section taken substantially on the line IA—IA of Figure 1.

Figure 2 is a front elevational view of the automobile, parts being broken away and omitted to better illustrate the battery installation.

Figure 3 is a vertical longitudinal section of the battery box showing the battery in side elevation.

Figure 4 is a transverse section thereof showing the battery in end elevation.

Figures 5 and 6 are views similar to Figure 1 of a somewhat modified construction.

Figure 7 is a front view, similar to Figure 2, of the embodiment of Figure 5.

Figures 8 and 9 are side and front elevational views respectively, parts broken away, of the air intake portions of the embodiment of Figure 5 and 6, and Figure 10 is a front elevational view similar to Figure 2 of the vehicular installation shown in Figure 6.

Figure 11 is a view similar to Figure 1 of another modification.

Figure 12 is a plan view thereof, parts of the hood and cowling being broken away.

Figure 13 is a front view thereof similar to Figure 2.

Figure 14 is a sectional detail taken substantially on the line 14—14 of Figure 12 and looking in the direction of the arrows; and Figure 15 is a horizontal section taken substantially on the line 15—15 of Figure 11 and looking in the direction of the arrows.

Referring now to the drawings, reference character 11 designates the body of a motor car, shown as having an engine compartment 12 located at the front thereof and separated from the passenger compartment (undesignated) by a dash panel 15, directly against which the battery box 17 is supported. The box is attached to the dash by such means as the angle bracket 18, and preferably also directly supported from a frame portion, as 20, of the vehicle, by rigid supporting elements designated 22, relieving the dash of the strain which the weight of the battery would otherwise impose. The engine compartment is shown as having a hood including a top 25 hinged at its back to the top of the dash panel, and adapted to be raised from the front end of the vehicle. The radiator is located inside the hood and free thereof. Appurtenant the engine 13 are one or more electrically operable elements including spark plugs 24 and the electric starter 16.

Ventilating air for the battery case is conducted from a point in front of the radiator through a conduit 27 formed of a channeled sheet metal element secured, as by welding, to the under side of the hinged top 25 of the hood, and terminating at its front extremity at an inlet opening or mouth 28 either formed as an opening directly in the top 25, as shown, or, if desired, projecting downwardly behind the grille 30. At its rear extremity the conduit 27 is connected by means of a flexible tube 33 to the top of the battery box. From the bottom of the case extends an air discharge tube 35, projecting downwardly into the air stream which flows beneath and around the motor when the car is in motion, so that the entraining action of the air flowing about the rearwardly directed opening of such discharge pipe may by ejector action assist the outflow of air from the battery case. Air flow within the case about the entire battery 36 may be promoted by a combined baffle and supporting element, as 38, which forces the air to travel entirely around the battery.

In the modified construction shown in Figures 5 and 7, the similarly mounted battery box 17A is ventilated from an air inlet 20A located in the false radiator cap or ornament 26A, to which inlet the battery box is connected by means of a tube 27A which may, if the front portion of the top section 25A of the hood is fixedly positioned, be of rigid construction, although this will be seen to be a matter of choice. The air inlet passage so provided delivers to the battery case unheated air taken at a maximum height above the street.

A further modification, shown in Figures 6, 8, 9 and 10 provides for conducting to the battery box, 17B, through a conduit 27B, unheated air taken from an inlet located in the head lamp supports 29B. Such arrangement will also be seen to enable the interception of unheated air from a position directly in the air stream caused by movement of the vehicle, and the discharge from the ventilating case may similarly be conducted through a discharge pipe 35B, extending downward into a suitable position in the air stream about and under the engine.

In the modification shown in Figures 11 to 15 inclusive, the battery box 17C is mounted upon the dash panel 15C over the motor and near one of the side walls of the hood 25C, as best shown in Figures 12 and 13. The air inlet is formed as a simple opening in the box, such opening being, in the illustrative construction shown, formed in the cover section 16C and surrounded if desired by a soft gasket 41. The air outlet tube 19C extends from the bottom of the box to a position somewhat below the motor and floor boards, substantially in the manner previously described.

The side of the hood panel is provided with a projecting and ornamental louver section 43, having openings therein through which air may be admitted to and/or exhausted from the engine compartment. As best shown in Figure 12, the louver section projects farthest at the front, where it may serve as an inlet for the ventilating air delivered to the battery box. For this purpose a duct element 45 is fastened to the inside of the hood 25C. The main portion of the duct lies above the louver section 43, but at its forward end the duct extends downward into connection with the inlet openings 44 in the front of the louver section, through which openings air is directed by the movement of the vehicle, while at its rear end the duct is provided with an inwardly directed elbow section 46 adapted to register with the inlet opening in the cover section of the box when the hood occupies its usual closed position, although when the hood is raised, the duct may be freely lifted clear of the box, the soft gasket member 41 providing a substantially air tight connection and preventing rattling when the hood is clamped shut. The louver section and the openings 44 are preferably so arranged as to scoop unheated air and force it through the box, while the air draft through the box is also assisted by the arrangement of the outlet conduit 19C, substantially in the manner described in connection with the disclosure of the first embodiment.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In combination with an automotive vehicle incorporating electrically operable elements and having a frame, an engine mounted in the frame, one more of said electrically operable elements being arranged appurtenant the engine, hood-like enclosing means defining a compartment for the engine, a storage battery for supplying current to said electrically operable elements, and means for supporting and ventilating the battery including a battery box having at least one wall bounding a portion of said engine compartment, said box being normally closed to isolate its interior from said compartment and having air inlet and outlet portions, and an ornamental air inlet scoop member arranged upon top and near the front of said hood-like enclosing means and connected to said inlet portion of the box.

2. In combination with an automotive vehicle incorporating electrically operable elements and having a frame, an engine mounted in the frame, one or more of said electrically operable elements being arranged appurtenant the engine, a radiator for dissipating the waste heat of the engine, hood-like enclosing means for the engine and radiator, a storage battery for supplying current to said electrically operable elements, and means for supporting and ventilating the battery, including a battery box supported from the frame adjacent the engine, and an ornamental air inlet scoop member arranged near the front of and over said hood means in a position to act as a radiator ornament.

3. In combination with a vehicle incorporating electrically operable elements and having a frame, an engine compartment, an engine in said compartment, a passenger compartment, hood and cowl portions arranged over parts of said compartments, one or more of said electrically operable elements being appurtenant said engine, a storage battery for supplying current to said electrically operable elements, and means for supporting and ventilating said storage battery including a battery box enclosing the battery and having at least one wall bounding a portion of the engine compartment, said box having air inlet and outlet portions, and air scooping means connected to said air inlet portion and projecting above said hood portion.

4. In combination with an automotive vehicle incorporating electrically operable elements and having a frame, an engine mounted in the frame, one more of said electrically operable elements being arranged appurtenant the engine, hood-like enclosing means defining a compartment for the engine, a storage battery for supplying current to said electrically operable elements, and means for supporting and ventilating the battery including a battery box having at least one wall bounding a portion of said engine compartment, said box being normally closed to isolate its interior from said compartment and having air inlet and outlet portions, and an ornamental air inlet scoop member arranged upon the outside of said hood-like enclosing means and connected to said inlet portion of the box.

WALTER S. SAUNDERS.